(12) United States Patent
Lin et al.

(10) Patent No.: US 10,090,746 B2
(45) Date of Patent: Oct. 2, 2018

(54) 8-POLE, 2-PHASE BIPOLAR STEP MOTORS WITH EASY MANUFACTURE AND OPTIMUM TORQUE FOR SIZE

(71) Applicant: Lin Engineering, Inc., Morgan Hill, CA (US)

(72) Inventors: Ted T. Lin, Saratoga, CA (US); Richard L. Badgerow, Watsonville, CA (US)

(73) Assignee: Lin Engineering, Inc., Morgan Hill, CA (US)

( * ) Notice: Subject to any disclaimer, the term of this patent is extended or adjusted under 35 U.S.C. 154(b) by 364 days.

(21) Appl. No.: 15/008,264

(22) Filed: Jan. 27, 2016

(65) Prior Publication Data

US 2017/0110953 A1 Apr. 20, 2017

Related U.S. Application Data

(60) Provisional application No. 62/242,559, filed on Oct. 16, 2015.

(51) Int. Cl.
*H02K 37/04* (2006.01)
*H02K 37/18* (2006.01)

(52) U.S. Cl.
CPC ............ *H02K 37/04* (2013.01); *H02K 37/18* (2013.01); *H02K 2213/03* (2013.01)

(58) Field of Classification Search
CPC ..... H02K 37/04; H02K 37/18; H02K 2213/03
USPC ...................................................... 310/49.44
See application file for complete search history.

(56) References Cited

U.S. PATENT DOCUMENTS

| 4,095,161 | A | | 6/1978 | Heine et al. |
| 4,315,171 | A | | 2/1982 | Schaeffer |
| 4,873,462 | A | | 10/1989 | Harned |
| 4,910,475 | A | | 3/1990 | Lin |
| 5,019,732 | A | * | 5/1991 | Spiesser ................. H02K 7/06 310/49.48 |
| 5,128,570 | A | | 7/1992 | Isozaki |
| 5,315,192 | A | | 5/1994 | Satomi |
| 5,374,865 | A | | 12/1994 | Yoshimura et al. |

(Continued)

OTHER PUBLICATIONS

Printout: NEMA Standards Publication ICS 16, "Industrial Control and Systems: Motion/Position Control Motors, Controls, and Feedback Devices", sections 3.2.3, pp. 17-24; section 3.4.3, pp. 41-46; sections 4.1, pp. 47-58; section 4.3, pp. 84-96.

*Primary Examiner* — Forrest M Phillips
(74) *Attorney, Agent, or Firm* — Thomas Schneck

(57) ABSTRACT

Step motors have a uniformed 8-stator pole design, while maintaining the number of stator teeth very close to the number of rotor teeth for better torque. A two-phase bipolar stepper includes an 8-pole stator with a plurality of stator teeth uniformly arranged on each pole. If D is the nominal inner diameter of the stator expressed in millimeters, a number of stator teeth per pole equal to D÷3 (rounded to the nearest integer) will accommodate the required winding needle space between adjacent stator poles. The step motor also has a rotor mounted for rotation within the stator with a plurality of rotor teeth. The respective numbers of rotor and stator teeth may differ at most by two or have a tooth ratio greater than 95%. The teeth should have minimum tooth width and separation of at least 0.5 mm for adequate contrasting magnetic definition (polarity and/or flux amplitude) in the rotor-stator interaction.

14 Claims, 3 Drawing Sheets

(56) References Cited

U.S. PATENT DOCUMENTS

| | | | | |
|---|---|---|---|---|
| 6,057,613 | A * | 5/2000 | Trago | H02K 37/18 |
| | | | | 310/216.111 |
| 6,741,006 | B2 | 5/2004 | Sakamoto | |
| 6,903,476 | B2 * | 6/2005 | Sakamoto | H02K 29/03 |
| | | | | 310/156.64 |
| 7,518,270 | B2 * | 4/2009 | Badgerow | H02K 37/18 |
| | | | | 310/49.44 |
| 8,970,083 | B2 | 3/2015 | Zhao | |
| 2002/0067092 | A1 * | 6/2002 | Crapo | H02K 1/278 |
| | | | | 310/156.47 |
| 2008/0224574 | A1 * | 9/2008 | Enomoto | H02K 1/146 |
| | | | | 310/49.01 |
| 2011/0050009 | A1 * | 3/2011 | Fukuzawa | H02K 1/145 |
| | | | | 310/49.16 |
| 2014/0111056 | A1 * | 4/2014 | Lin | H02K 37/04 |
| | | | | 310/208 |

\* cited by examiner

8-POLE, 2-PHASE BIPOLAR STEP MOTORS WITH EASY MANUFACTURE AND OPTIMUM TORQUE FOR SIZE

CROSS-REFERENCE TO RELATED APPLICATION

The application claims priority under 35 U.S.C. 119(e) from U.S. Provisional Application 62/242,559, filed Oct. 16, 2015.

TECHNICAL FIELD

The present invention relates to step motors with emphasis on manufacturability and providing optimal holding torque for a given motor size.

BACKGROUND ART

Two-phase bipolar or 4-phase unipolar step motors have been popularly used in the motion, control industry, starting first with a 3.6° step motor (100 full steps per revolution). The 3.6° stepper was very popular early in the step motor history, because it can run at a good speed. (A bigger step size with the same pulse rate provides a higher speed in terms of revolution per sec.) However, in order to satisfy constraints, the number of stator poles must be 4, which is not an efficient design.

Meanwhile, applications increasingly required better resolution than speed. As a result, a 1.8° stepper was introduced. Design constraints allow this motor to be constructed with 8 stator poles. The 8-pole design is an efficient design and easy for manufacturing. Thus, 1.8° steppers quickly became the most popular step motor.

Demand of higher resolution steppers increased in the 1980s, especially for hard disk drive (HDD) applications. As a result, first a 0.9° stepper and later a 0.45° stepper were introduced.

A key constraint of a stepper design is to satisfy the following equations:

$$S = \text{full step angle} = 360°/(Nr \times Np)$$

$$Nr/Nsp + (1/Np) \text{ or } Nr/Nsp - (1/Np) \text{ must be integer,}$$

where Nr=Number of rotor teeth;
 Nsp=Number of stator poles;
 Np=Number of mechanical phases
  =3 for 3-phase unipolar motor
  =4 for 2-phase bipolar motor.

In order to meet this general rule, for a 2-phase bipolar stepper, a 3.6° stepper must have 4 uniformed stator poles, a 1.8° stepper must have 8 uniformed stator poles, a 0.9° stepper must have 16 uniformed stator poles, and a 0.45° stepper must have 32 poles. Because 8-pole stators are easy and inexpensive to manufacture, while higher numbers of stator poles (e.g. 16 or 32) cost much more to produce, a modified 8-pole 0.9° stepper was developed by shifting the stator pole teeth to satisfy the rule. Subsequently, a modified 12-pole 0.9° stepper was also designed to accommodate the 8-pole and 16-pole designs (U.S. Pat. No. 4,910,475).

When designing the number of rotor (and stator) teeth for the motor, the preference in the industry has always been for full step angles such as 3.6°, 1.8°, 1.2°, 0.9°, 0.6°, and 0.45°, corresponding to exactly 100, 200, 300, 400, 600 and 800 steps per a complete 360° rotation. Most engineers stick to step angles of 1.8°, 0.9° or 0.45° for a 4-phase unipolar stepper or a 2-phase bipolar stepper, and step angles of 1.2° or 0.6° for a 3-phase unipolar stepper or a 3-phase bipolar motor.

Here is a table showing design parameters for the most popular stepper motors that have been used in the industry:

| Standard Popular Design | | | |
| --- | --- | --- | --- |
| Nr | Np | Nsp | S = 360/(Nr*Np) (degree) |
| 16 | 3 | 6 | 7.5 |
| 32 | 3 | 6 | 3.75 |
| 50 | 3 | 6 | 2.4 |
| 64 | 3 | 6 | 1.875 |
| 100 | 3 | 12 | 1.2 |
| 200 | 3 | 6 | 0.6 |
| 25 | 4 | 4 | 3.6 |
| 50 | 4 | 8 | 1.8 |
| 100 | 4 | 8* | 0.9 |
| 100 | 4 | 12* | 0.9 |
| 100 | 4 | 16 | 0.9 |
| 200 | 4 | 8* | 0.45 |
| 200 | 4 | 12* | 0.45 |
| 200 | 4 | 32 | 0.45 |
| 50 | 6 | 12 | 1.2 |
| 50 | 6 | 9* | 1.2 |
| 100 | 6 | 9* | 0.6 |
| 100 | 6 | 12* | 0.6 |
| 50 | 10 | 10* | 0.72 |
| 100 | 10 | 10* | 0.36 |
| 200 | 10 | 10* | 0.18 |

*non-uniform stator teeth distribution on the pole

Demand for smaller size motors have developed more recently. It is getting harder to manufacture 1.8° steppers when the motor size becomes smaller and smaller. In addition to overall manufacturability, a small motor generally can't produce enough torque for many desired applications. Often, a gear reducer must be added to increase the torque. In such cases, speed becomes more important than the resolution.

An 8 stator pole design is still the best choice, because narrower tooth designs not only are difficult to produce, but also lose torque. For adequate magnetization of the teeth and contrast with respect to the spaces between the teeth, both the tooth width and the tooth separation must generally be a minimum of 0.5 mm. Any narrower or closer, and loss of torque would become substantial. Meanwhile, to fully utilize the effective magnetic interaction between stator and rotor, we need to maximize the number of stator teeth, while still maintaining enough space between adjacent stator poles for the winding needle to pass (in order to form the electromagnetic coils around each stator pole). Typically, the winding needle space is a minimum of 1.07 mm. The available space is a function of the stator's inner diameter (ID). Therefore, selecting a proper stator ID for the certain stepper is part of the design criteria. An 8-pole 1.8° 2-phase bipolar stepper has a minimum stator ID of 19 mm in order to accommodate 6 teeth per stator pole (48 total stator teeth) plus the requisite winding needle space. Smaller 1.8° steppers must have fewer stator teeth per pole in order to leave room to accommodate the winding needle, sacrificing torque as a result.

SUMMARY DISCLOSURE

Stepper motors in accord with the present invention have a uniformed 8-stator pole design, while maintaining the number of stator teeth very close to the number of rotor teeth for better torque, and also accommodating the required space for the winding needle.

In particular, a two-phase bipolar step motor comprises an eight-pole stator with a specified inner diameter and a specified plurality of stator teeth uniformly arranged on each stator pole. More specifically, if D is the inner diameter of the stator in millimeters, a number of stator teeth per pole equal to D÷3 (rounded to the nearest integer) will accommodate the required winding needle space of at least 1.07 mm between adjacent stator poles. In addition to the stator, the step motor also comprises a rotor mounted for rotation within the stator and having a specified plurality of rotor teeth. The respective numbers of rotor and stator teeth may be such as to differ at most by two (for motors with stator inner diameter less than 19 mm) or such that ratio of lesser to greater numbers of the respective stator and rotor teeth is greater than 95% (for stators with greater than 200 full steps per revolution). In either case, the rotor teeth and stator teeth should have both a minimum tooth width and minimum tooth separation of at least 0.5 mm for adequate contrasting magnetic definition (polarity and/or flux amplitude) in the rotor-stator interaction in order to yield the best torque performance.

DETAILED DESCRIPTION

Figure 1:
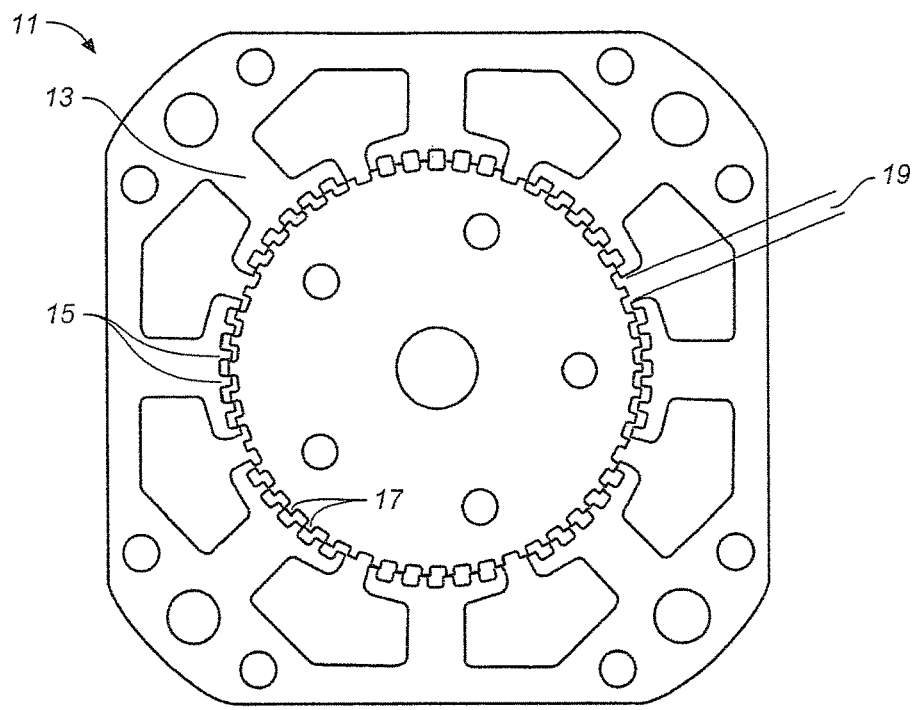
FIGS. 1 and 2 show standard 1.8° motors of the prior art having 6 and 5 teeth per stator pole, respectively. These motors have respective 42 mm and 35 mm square dimensions, and 26 mm and 19 mm stator inner diameters.
Figure 2:
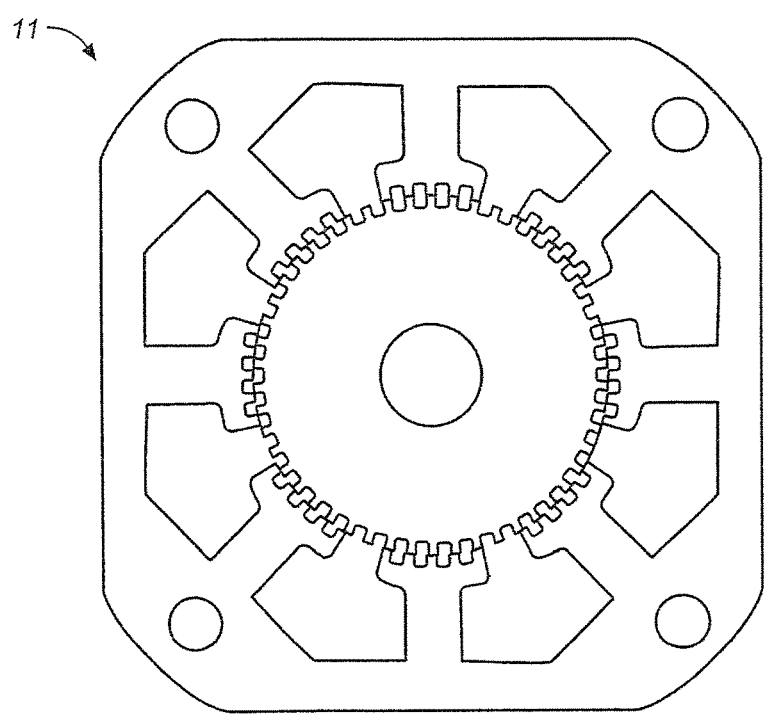

In FIG. 1, a 1.67 inch (42 mm) square motor 11 has a stator inner diameter (ID) of 1.0197 inch (26 mm). All inner diameters as stated herein are generally within a tolerance of ±10% or better, and preferably within ±0.5 mm. Let us define Ns equal the number of stator teeth 15 and Nr equal the number of rotor teeth 17. The minimum space needed between stator poles 13 for fitting a winding needle is 0.042 inch (1.07 mm). For 8 stator poles and 6 teeth per stator pole, the space for the winding needle is 0.064 inch (1.63 mm), which is sufficient. This standard 1.8-degree motor (#4118 size 17) has 50 rotor teeth and 6×8=48 stator teeth. The tooth ratio Ns/Nr=48/50=0.96 gives good torque. In FIG. 2, a 1.38 inch (35 mm) square motor 21 has a stator inner diameter of 0.7460 inch (19 mm). For this smaller size motor with 8 stator poles, a design having 6 teeth per stator pole leaves not enough Space for the winding needle. There is no choice but to change to a 5 teeth per stator pole design to provide enough space for a winding needle to pass by. Accordingly, this motor has only 5 teeth per stator pole, so that the 0.085 inch (2.16 mm) winding needle space is adequate. This standard 1.8-degree motor (#3518 35 mm square) has 50 rotor teeth but only 5×8=40 stator teeth. The tooth ratio Ns/Nr=40/50=0.80 is reduced, but adequate for many applications. However, the torque drops by ⅙ from the 6-teeth stator design of the larger motor.

Figure 3:
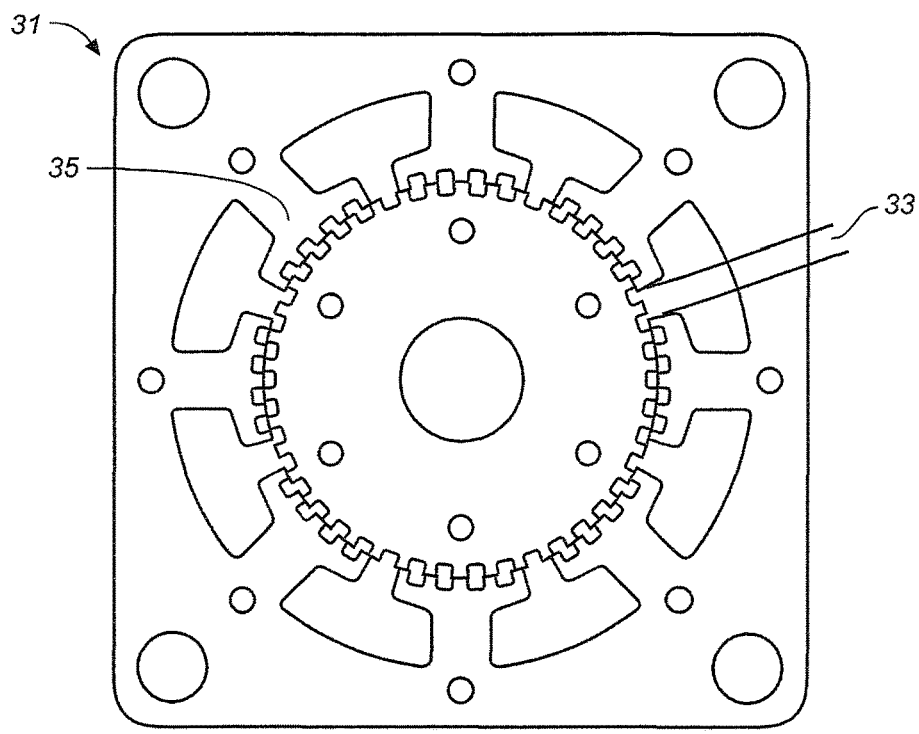
FIGS. 3 and 4 show stepper motor embodiments of the present invention having 168 and 104 steps per revolution (2.142857 . . . ° and 3.461538 . . . ° step angles), respectively. These are smaller 28 mm and 16 mm square motors with only 16 mm and 10 mm stator inner diameters.

In FIG. 3, a 1.11 inch (28 mm) square motor 31 has a stator inner diameter of 0.6299 inch (16 mm±0.5 mm). There are again 5 teeth per stator pole, so that the 0.049 inch (1.24 mm) winding needle space 33 between stator poles 35 is also adequate, albeit barely. In order to improve torque, Ns/Nr=40/42=0.95, so that for 40 stator teeth, 42 rotor teeth are preferable. Thus, this smaller motor has 168 steps per revolution and a 360°/168=2.142857 . . . ° step angle. Thus, a stepper having a stator inner diameter of 16 mm can accommodate 16÷3=5 (rounded) stator teeth per pole for a total of 40 stator teeth, while leaving sufficient room (1.24 mm) for the winding needle.

Figure 4:
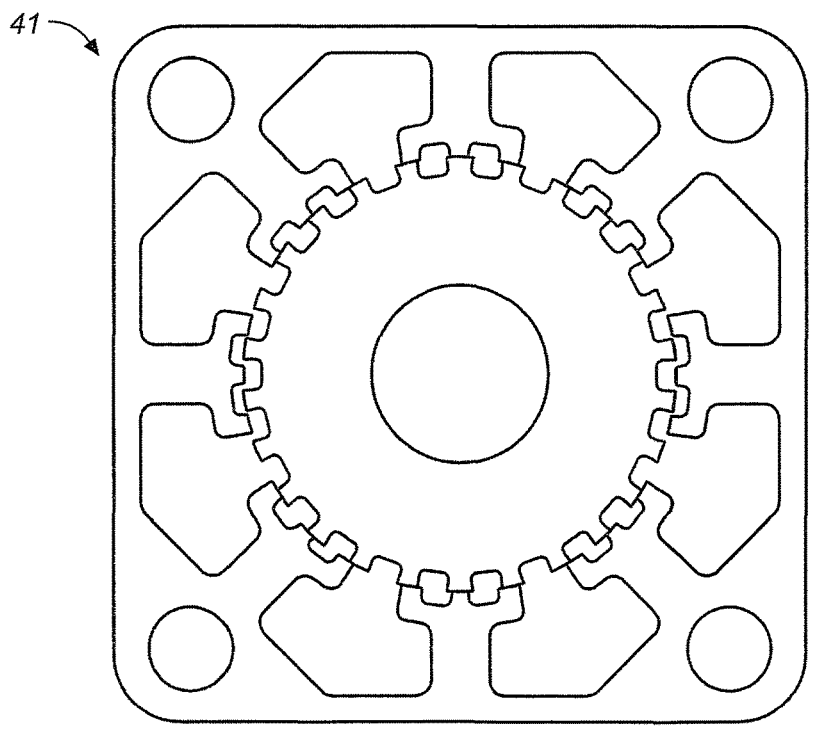

In FIG. 4, a yet smaller motor 41 of just 0.63 inch (16 mm) square outer dimension and 0.394 inch (10 mm) stator inner diameter cannot have 5 teeth per stator pole. We cannot even have a 4-teeth-per-stator-pole design with 10 mm stator inner diameter. Providing 3 teeth per stator pole gives a 0.047 inch (1.19 mm) winding needle space, which even then is barely adequate. Thus, there are a total of only 24 stator teeth. For adequate torque, a preferred design has 26 rotor teeth, for a tooth ratio Ns/Nr=24/26=0.92. This yields a motor with 104 steps per revolution, or 360°/104=3.461538 . . . ° step angle. Thus, a stator inner diameter of 10 mm accommodates 10÷3=3 (rounded) teeth per stator pole. The new invention creates a uniformed 8-stator pole design with a 104 step per revolution that provides a good torque at the high speed while being easier to produce than the prior 100 step embodiment of FIG. 2.

Not shown, but also possible is a motor with a 12.5 mm or 13 mm stator inner diameter, a size between that of the steppers in FIGS. 3 and 4. This would accommodate 13÷3=4 (rounded) teeth per stator pole for a total of 32 stator teeth. With 34 rotor teeth, the step motor would be characterized by 136 full steps per revolution (2.647058 . . . ° full step angle). The 168 stepper of FIG. 3 and the 136 stepper fit in between the older 100 (3.6°) stepper and the very popular 200 (1.8°) stepper, with the number of stator teeth in both cases being very close to the number of rotor teeth for better torque.

Step motors with more than 200 full steps per revolution (smaller than 1.8° step angle) can also be produced without substantial loss of torque, provided the ratio of lesser to greater numbers of rotor and stator teeth are at least 95%, such as when the number of stator teeth is not more than two less than the number of rotor teeth (Ns=Nr−2). [Note: the number of stator teeth could potentially be greater than the number of rotor teeth, as when Ns=Nr+2.] The increased number of steps per revolution gives a higher resolution for those applications that require it.

Figure 5:
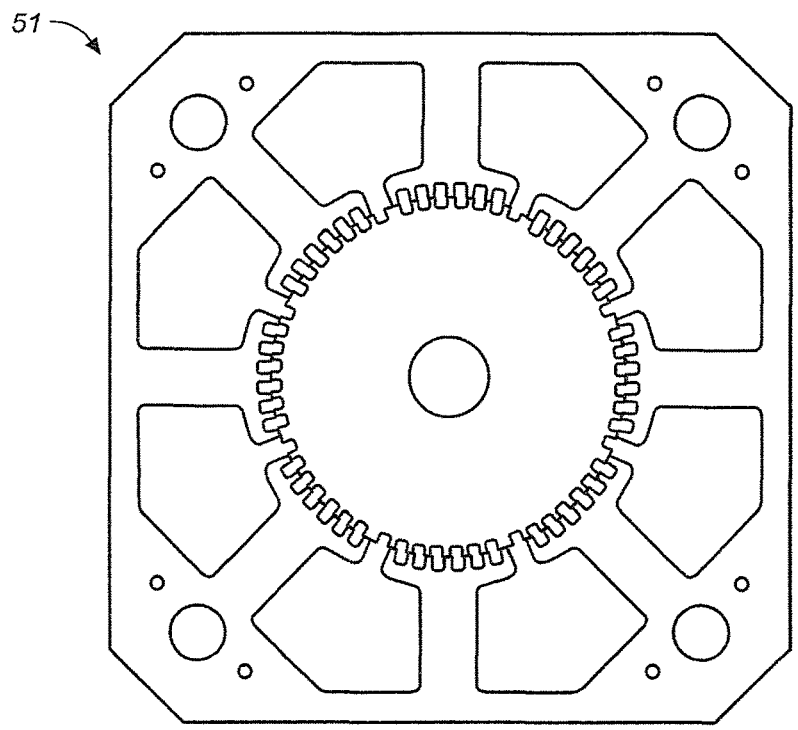
FIGS. 5 and 6 show stepper motor embodiments of the present invention having 232 and 328 steps per revolution (1.551724 . . . ° and 1.097560 . . . ° step angles), respectively. These are larger motors than the standard 1.8° stepper, but are close to minimum size at 22 mm and 31 mm stator inner diameters with minimal loss of torque.
Figure 6:
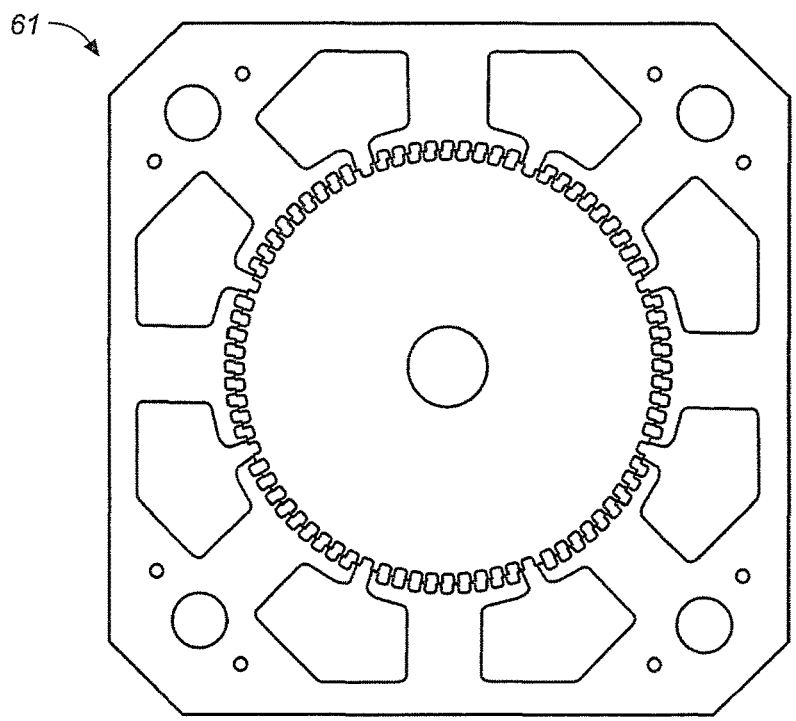

Motors with 232, 264, 296, 328 and 392 steps per revolution fall between the conventional 200 (1.8°) stepper and 400 (0.9°) stepper, providing finer step resolution than the 200 stepper and faster speed than the 400 stepper. These steppers can still have a uniformed 8-stator pole design while maintaining the number of stator teeth very close to the number of rotor teeth for better torque. FIGS. 5 and 6 show two examples 51 and 61 with 232 and 328 steps, the 232 stepper having 7 stator teeth per pole and a stator inner diameter of 22 mm, and the 328 stepper having 10 stator teeth per pole and a stator inner diameter of 31 mm.

For even higher resolution, 424 and 456 steppers could be made with respective 13 and 14 teeth per stator pole in a uniformed 8-pole design. To optimize winding needle space, nominal stator inner diameters (within ±10%, or more preferably ±0.5 mm tolerances) of 39 mm and 45 mm would be provided.

Here is a table summarizing several of the possible 8-pole step motor embodiments in accord with the present invention:

| Ratio Ns/Nr (%) | # of Stator Teeth (Ns) | # of Rotor Teeth (Nr) | Steps/ Revolution | Full Step Angle (°) | Pref. Stator Inner Diam. (mm) |
|---|---|---|---|---|---|
| 92.3 | 24 | 26 | 104 | 3.4615 . . . | 10 |
| 94.1 | 32 | 34 | 136 | 2.6470 . . . | 13 |
| 95.2 | 40 | 42 | 168 | 2.1428 . . . | 16 |
| 96.6 | 56 | 58 | 232 | 1.5517 . . . | 22 |
| 97.0 | 64 | 66 | 264 | 1.3636 . . . | 24 |
| 97.3 | 72 | 74 | 296 | 1.2162 . . . | 26 |
| 97.6 | 80 | 82 | 328 | 1.0975 . . . | 31 |
| 98.0 | 96 | 98 | 392 | 0.9183 . . . | 35 |
| 98.1 | 104 | 106 | 424 | 0.8490 . . . | 39 |
| 98.2 | 112 | 114 | 456 | 0.7894 . . . | 45 |

In general, we like to design the number of the stator teeth as close as to the number of rotor teeth to generate more torque and still keep enough pole-teeth spacing for winding needle to pass by. We also would like uniform pole spacing regardless of the number of poles in the design. Therefore, certain stator ID with certain step angles can optimize the motor performance. For instance, 16 mm outer diameter (OD) bearing is a popular bearing in the industry. For easy manufacturing, it would make sense to design a 16 mm stator ID to match that bearing OD. We can achieve this and simultaneously optimize the torque by selecting a 168 stepper with 360°/168=2.142857 . . . ° full step angles. The number of stator teeth with 5 teeth per pole (Ns=40) is very close to the number of rotor teeth (Nr=42), while still keeping a reasonable space between stator pole-teeth for the winding needle to pass by.

Besides retaining adequate step motor torque, another benefit is that the inductance of a step motor will be reduced when a lower number of stator teeth per pole is used. The invention is perfect for a smaller motor to provide more torque and speed than the standard motor design. A potential drawback is that the step resolution is also reduced. However, most applications for a small motor always couple with a gear reducer or lead screw. The mechanical reduction will provide plenty of resolution for the applications. Step motor torque and speed are more important than the resolution.

In applications requiring high speed capability, the industry trend is moving to smaller motor sizes while still maintaining adequate torque. The conventional design for a 100-step (3.6°) motor has only 4 stator poles with resulting poor efficiency. However, using 8 uniformed stator poles, a 104-stepper design (3.461538 . . . ° step angle) with 10 mm stator ID meets the requirements.

What is claimed is:

1. A two-phase bipolar step motor, comprising:
   an eight-pole stator with a specified inner diameter of at most 16.5 mm and having a specified plurality less than six of stator teeth on each stator pole, the number of stator teeth per pole being the inner diameter in millimeters divided by three rounded to the nearest integer;
   a rotor having a plurality of rotor teeth thereon, the rotor mounted for rotation within the stator, the number of rotor teeth being equal to the number of stator teeth plus or minus two.

2. The step motor as in claim 1, wherein a winding needle space between adjacent stator poles is a minimum of 1.07 mm.

3. The step motor as in claim 1, wherein rotor teeth and stator teeth have both a minimum tooth width and a minimum separation from adjacent teeth of 0.5 mm.

4. The step motor as in claim 1, wherein the stator has a 10 mm inner diameter, 3 teeth per stator pole, 26 rotor teeth and is characterized by 104 full steps per revolution.

5. The step motor as in claim 1, wherein the stator has a 13 mm inner diameter, 4 teeth per stator pole, 34 rotor teeth and is characterized by 136 full steps per revolution.

6. The step motor as in claim 1, wherein the stator has a 16 mm inner diameter, 5 teeth per stator pole, 42 rotor teeth and is characterized by 168 full steps per revolution.

7. A two-phase bipolar step motor, comprising:
   an eight-pole stator with a specified inner diameter and having a specified plurality greater than six of stator teeth on each stator pole, the number of stator teeth per pole being the inner diameter in millimeters divided by three rounded to the nearest integer;
   a rotor having a plurality of rotor teeth thereon, the rotor mounted for rotation within the stator, the number of rotor teeth being equal to the number of stator teeth plus or minus two, wherein a ratio between relatively lesser and greater numbers of rotor and stator teeth is greater than 95% and the motor is characterized by greater than 200 full steps per revolution.

8. The step motor as in claim 7, wherein the stator has a 22 mm inner diameter, 7 teeth per stator pole, 58 rotor teeth and is characterized by 232 full steps per revolution.

9. The step motor as in claim 7, wherein the stator has a 24 mm inner diameter, 8 teeth per stator pole, 66 rotor teeth and is characterized by 264 full steps per revolution.

10. The step motor as in claim 7, wherein the stator has a 26 mm inner diameter, 9 teeth per stator pole, 74 rotor teeth and is characterized by 296 full steps per revolution.

11. The step motor as in claim 7, wherein the stator has a 31 mm inner diameter, 10 teeth per stator pole, 82 rotor teeth and is characterized by 328 full steps per revolution.

12. The step motor as in claim 7, wherein the stator has a 35 mm inner diameter, 12 teeth per stator pole, 98 rotor teeth and is characterized by 392 full steps per revolution.

13. The step motor as in claim 7, wherein the stator has a 39 mm inner diameter, 13 teeth per stator pole, 106 rotor teeth and is characterized by 424 full steps per revolution.

14. The step motor as in claim 7, wherein the stator has a 45 mm inner diameter, 14 teeth per stator pole, 114 rotor teeth and is characterized by 456 full steps per revolution.

* * * * *